United States Patent [19]

Overholt, Sr.

[11] Patent Number: 4,915,660

[45] Date of Patent: Apr. 10, 1990

[54] ANIMAL CALLING DEVICE HAVING A RESTRICTED BORE OPENING

[76] Inventor: Henry W. Overholt, Sr., Rte. One, Box 165, Marshallville, Ga. 31057

[21] Appl. No.: 99,122

[22] Filed: Sep. 21, 1987

Related U.S. Application Data

[63] Continuation-in-part of Ser. No. 786,594, Oct. 11, 1985, abandoned.

[51] Int. Cl.⁴ .............................................. A63H 5/00
[52] U.S. Cl. ................................. 446/207; 446/209
[58] Field of Search ............. 446/207, 208, 209, 202, 446/203, 204, 205, 206; 84/400

[56] References Cited

U.S. PATENT DOCUMENTS

| | | | |
|---|---|---|---|
| 333,094 | 12/1885 | Fuller | 446/208 |
| 1,729,336 | 9/1929 | France | 84/400 |
| 2,396,359 | 3/1946 | Yager | 446/208 |
| 2,493,472 | 1/1950 | Yentzen | 446/208 |
| 2,606,400 | 8/1952 | Olt et al. | 446/207 |
| 2,608,796 | 9/1952 | Bicocchi | 446/208 |
| 2,711,614 | 6/1955 | Halsten | 446/208 |
| 2,730,836 | 1/1956 | Faulk et al. | 446/207 |
| 3,001,322 | 9/1961 | Sanders | 446/207 |
| 4,050,186 | 9/1977 | Shults et al. | 446/207 |
| 4,143,485 | 3/1979 | Stewart | 446/207 |

*Primary Examiner*—Richard J. Johnson
*Assistant Examiner*—Sam Rimell
*Attorney, Agent, or Firm*—Thomas & Kennedy

[57] ABSTRACT

An animal calling device is disclosed having a main body portion with a cylindrical sound chamber end and a mouthpiece end generally continuous with the sound chamber. A groove formed in the mouthpiece is continuous with a bore formed in the sound chamber and a vibratable reed covers the groove and is secured at the interface of the mouthpiece and chamber. A plug, cap or integral wall closure is disposed in, over or in conjunction with the bore, respectively, to substantially close the bore but allow restricted airflow therethrough, thereby lowering the tone of the present device without having to cup the hands or fingers around the bore. The reed in one embodiment is seated on a sloping bridge portion to reduce the effort needed in blowing through the call while maintaining the low tone produced.

10 Claims, 3 Drawing Sheets

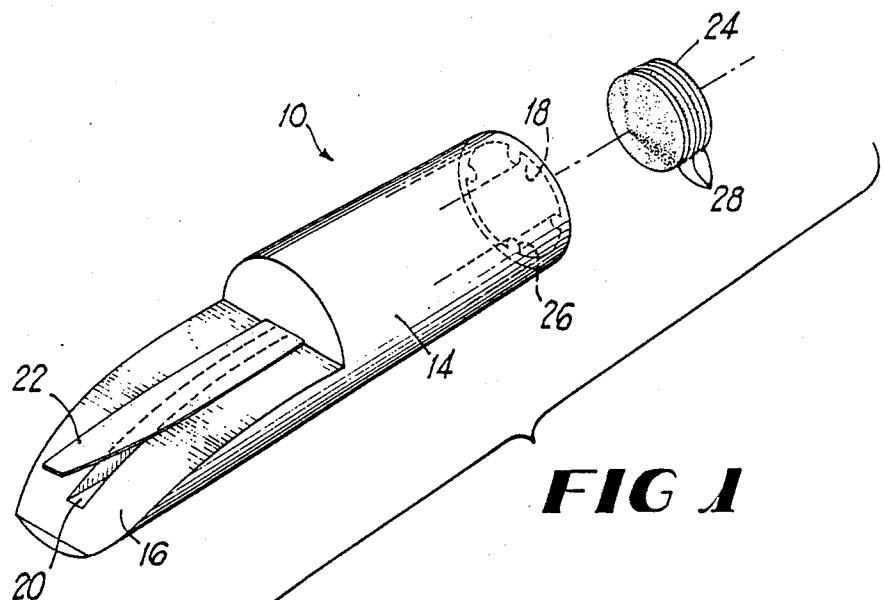
FIG 1
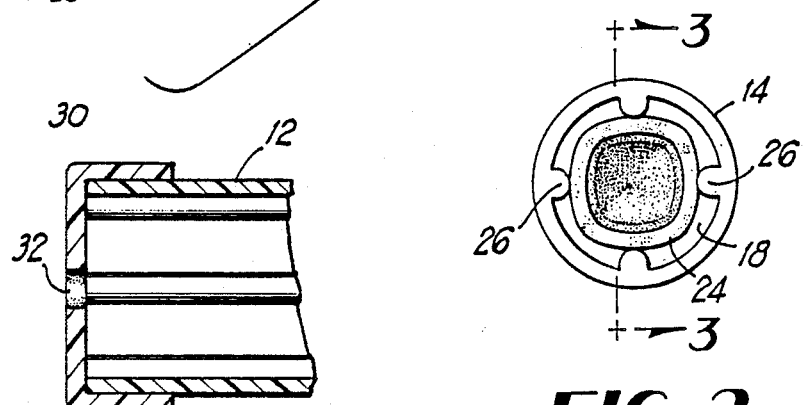
FIG 4A     FIG 2
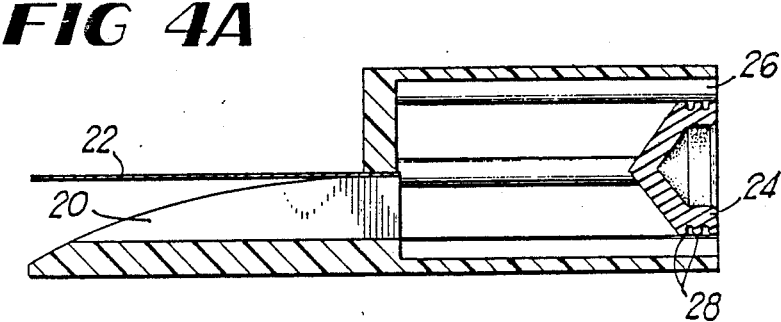
FIG 3

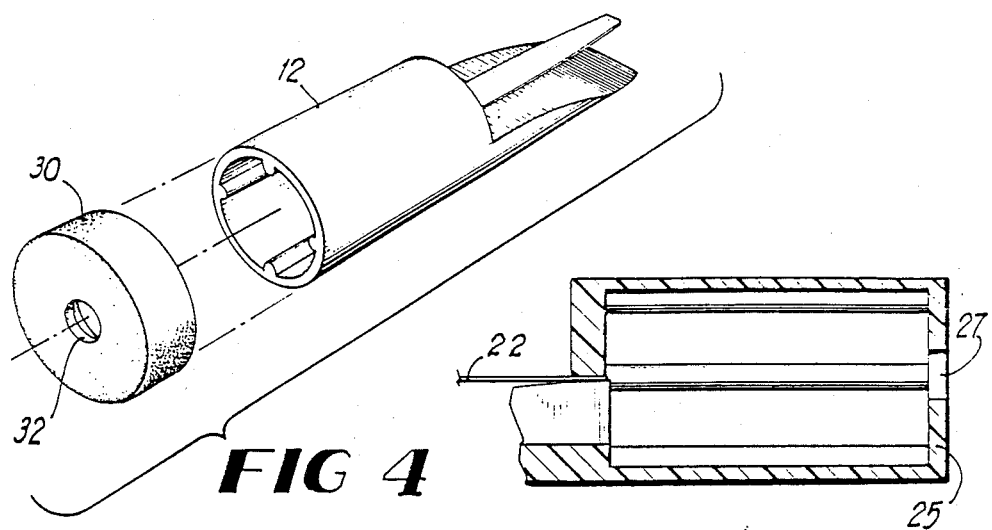
FIG 4
FIG 5
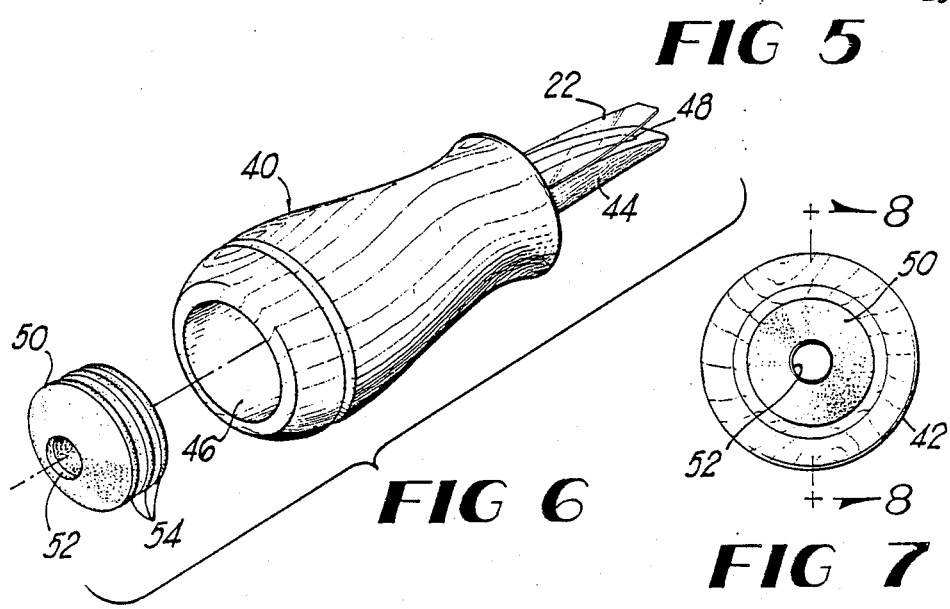
FIG 6
FIG 7
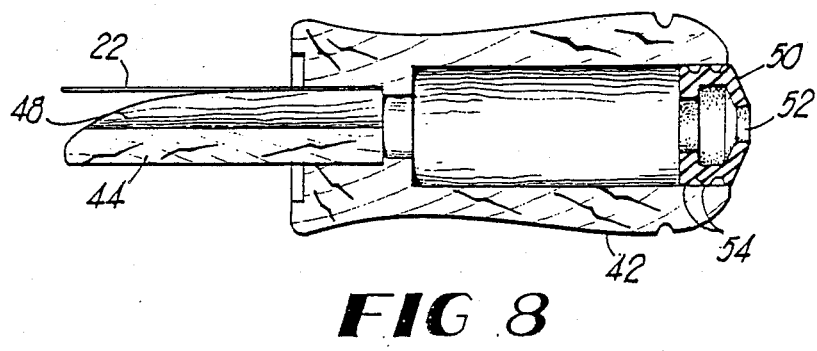
FIG 8

ANIMAL CALLING DEVICE HAVING A RESTRICTED BORE OPENING

This application is a continuation-in-part of the application 06/786,594, filed 10/11/85, now abandoned.

BACKGROUND OF THE INVENTION

Hunters and wildlife photographers often use artificial sound-producing devices to mimic the natural sound made by a certain animal for attracting the animal within range of the particular weapon or camera. While many such devices have been devised over the years, the success or failure of the animal call has been largely dependent on the skill of the user. Not only must the user know what sound the particular animal makes, they must also have the skill to produce that particular sound, using the sound-producing device. Thus, to be relatively successful, one must generally be an experienced hunter or photographer, in order to have heard and know what sound to mimic, in addition to being an experienced caller.

Most animal calls currently in use are types of wind instruments which use a vibrating reed-type element which is vibrated by the user blowing into the call. The sound produced is dependent on many variables, such as the type of reed, the size of the call and the sound chamber, the force used in blowing into the call, and the relative positioning of the hands of the user while holding and using the call. The last-mentioned factor is very important since the call must often be cupped in the hands to produce the sound with a low enough tone or pitch to attract certain species. This requirement becomes a disadvantage when the call is successful, as the hunter or photographer may have very little time to release the call and obtain, aim, and fire the weapon or camera.

One such call is disclosed in U.S. Pat. No. 4,050,186 to Shults, et al. for a Sound Producer, issued Sept. 27, 1977. The patentees emphasize the diameter and size of the bore of the sound chamber or barrel, showing an alternative embodiment having an enlarged sound chamber or one flared into a bell shape. This is designed to produce sound that carries a substantial distance, the barrel serving as an amplifier. In the method of use, cupping the hands over the barrel is recommended as a means of producing an undulating call.

SUMMARY OF THE INVENTION

It is, therefore, one of the principal objects of the present invention to provide an animal calling device that may be used to mimic the calls or sounds made by many different animals, and which is especially suited for attracting deer by producing the sound of a buck during rut.

Another object of the present invention is to provide an animal calling device that can produce the desired pitch or tone without requiring the user to hold or cup the end of the device in his hands, thereby freeing at least one hand for manipulation and aiming of a weapon or camera.

A further object of the present invention is to provide an animal calling device which is easy to use effectively, even by those with little or no experience, and which is inexpensive to produce.

These and additional objects are attained by the present invention which relates to an animal calling device having a body portion with a generally cylindrical end that has a bore therethrough. The other end is formed as a mouthpiece portion having a groove disposed therein, the bore and the groove being in communication. A reed member is disposed over the groove and secured at the interface of the cylindrical end and the mouthpiece portion. Disposed in or over the bore is a closure means for restricting airflow through the device.

The closure means, which may be a plug or cap member or which may be formed integrally with the barrel, permits restricted airflow through the present invention for lowering the tone produced, making the device particularly effective for deer calling. The low tones are produced without having to cup the hand or fingers around the device, leaving at least one hand free to manipulate a weapon or camera. The present calling device may also be used to produce the sounds of other animals, for example ducks or geese, this being dependent upon the force used to blow air through the device and the skill of the user. Various additional objects and advantages will become apparent from the below description, with reference to the accompanying drawings.

DESCRIPTION OF DRAWINGS

FIG. 1 is an exploded, perspective view of the present animal calling device;

FIG. 2 is an end elevational view of the present invention in assembled form, showing the end having the sound chamber;

FIG. 3 is a cross-sectional view of the present device, the section being taken on line 3—3 of FIG. 2;

FIG. 4 is an exploded, perspective view of an alternate embodiment of the present invention;

FIG. 4A is a partial, side elevational view, shown partially in cross section, of the embodiment shown in the preceding figure, shown here in an assembled relationship;

FIG. 5 is a partial, cross-sectional view of another embodiment of the present invention;

FIG. 6 is an exploded, perspective view of another embodiment of the present invention;

FIG. 7 is an end elevational view of the embodiment shown in preceding figure, here shown in assembled form;

FIG. 8 is a cross-sectional view of the embodiment shown in FIG. 6 and 7, the section being taken on line 8—8 of FIG. 7;

FIG. 10 is an assembled cross-sectional view of the embodiment shown in the preceding figure.

DETAILED DESCRIPTION OF THE PREFERRED EMBODIMENT

Figure 9:
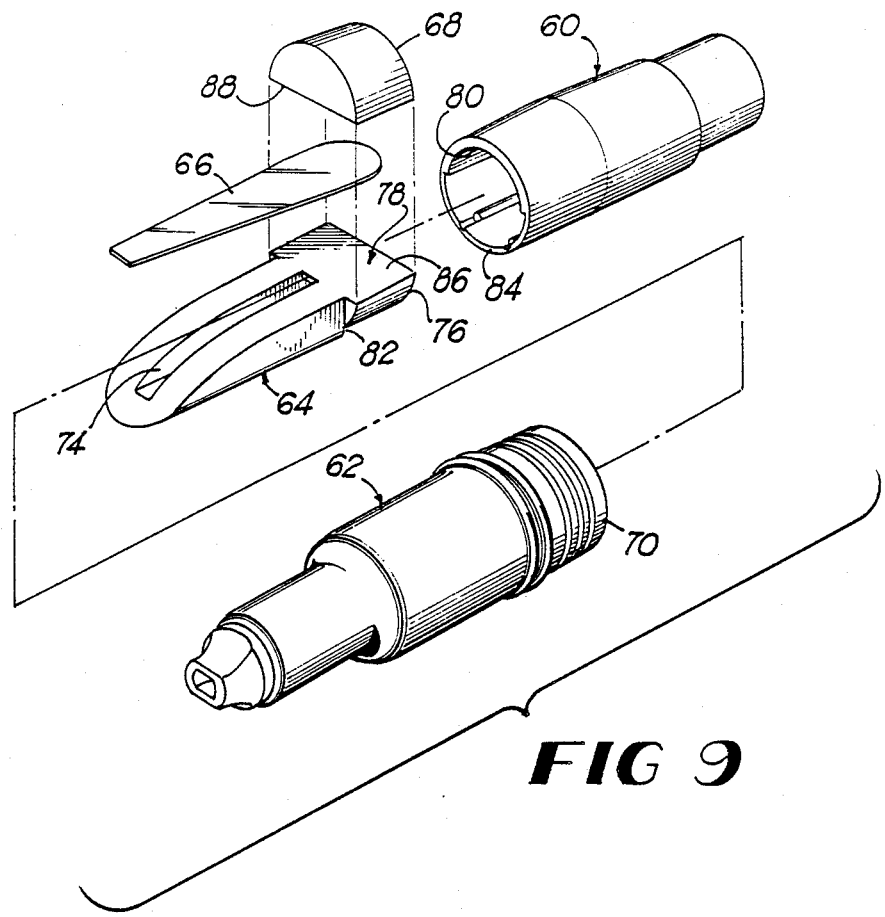
FIG. 9 is an exploded, perspective view of an alternate embodiment of the present invention.

Referring now more specifically to the drawings, and to FIG. 1 in particular, numeral 10 designates generally one embodiment of an animal calling device. The device has a main body portion 12, one end of which is formed as a barrel or sound chamber 14, and the other end of which is formed as a mouthpiece 16. The sound chamber has an internal bore 18, the construction designed to amplify the sound produced by the device. A channel or groove 20 is formed in the mouthpiece portion of the device and is in communication with bore 18. Overlying channel 20 is a reed 22 or reed-like insert which produces the desired sound when the user blows through the device. The reed may be formed of any suitable material, such as a plastic or resin-type material, and the main body portion may also be formed from any suitable material, such as plastic or wood. Disposed in or substantially covering or blocking the bore 18 is a closure means, such as a plug 24. The closure means may be formed from any suitable elastomeric material, such as natural or synthetic rubber or the like, or certain types of plastic or wood and has an outer diameter essentially equal to the inner diameter of the bore. In the alternative, the closure means may be formed integrally with the bore, as shown in FIG. 5, wherein numeral 25 indicates the closure means, which is an extension of the wall bore, and has an aperture 27 formed therein for permitting restricted airflow therethrough.

In the embodiment shown in FIGS. 1 through 3, the barrel has protrusions 26 on the inner surface thereof, the protrusions normally formed during the molding process. The protrusions serve to distort the plug slightly, preventing it from completely sealing the bore, so as to let air escape for the production of sound. The plug may also be provided with holding means, such as ribs 28, facilitating its retention in the bore.

With prior art calls of the general type shown, the sound chamber is completely open, being designed to amplify the sound produced over the largest area possible. This produces a relatively high-pitched tone which can only be lowered by cupping the fingers or hands around the end of the barrel, and which tone is generally unsatisfactory for deer calling. In contrast, the present invention, with its resilient closure or cover means, produces a relatively low tone without cupping the hand or fingers around the device and which is within essentially the same tonal range produced by deer.

This provides several distinct advantages for the hunter. The present invention closely approximates the actual call or grunt of deer, permitting its successful use without requiring a great deal of practice. In addition, since the invention produces the desired tone without requiring use of both hands, the hunter or photographer can have at least one hand free for setting up the anticipated shot. This is an important factor since, in many instances, speed and relative quiet in handling the weapon or camera are of the essence for obtaining a successful shot.

Another embodiment of the present invention is shown in FIG. 4. Here the main body portion 12 is essentially the same as shown in the preceding figures. The resilient closure means, however, takes the form of cap 30. The cap has means defining an aperture 32, formed therein for allowing air to escape from the sound chamber. While shown in the approximate center of the cap, the aperture could also be offset, or a plurality of smaller apertures could be provided, with the same effective result.

FIG. 5 shows another embodiment of the present invention wherein the closure means or extension 25 is formed integrally with the bore. An aperture 27 is provided in extension 25 for permitting restricted airflow therethrough, thereby lowering the tone produced by the device.

FIGS. 6, 7 and 8 illustrate another embodiment of the present invention, wherein features of the first mentioned embodiments are combined. The calling device 40, shown in FIG. 6, has a main body portion or barrel 42 and a mouthpiece portion 44. The barrel has a bore 46, here having relatively smooth sidewalls, and a channel 38 is formed in the mouthpiece portion, the channel being in communication with bore 46. As in the previous embodiments, reed 22 is press-fitted into the device at the interface where the mouthpiece and barrel meet. To restrict the volume of air emitted from the barrel or sound chamber a resilient closure means, such as plug 50, is disposed in the bore 46. Plug 50 has an aperture 52 formed therein, for allowing air to pass through the device, which would otherwise be sealed due to the smooth-sided bore. As with plug 24, shown in FIGS. 1 through 3, the plug 50 has outwardly projecting, parallel extension means or ribs 54, which facilitate its retention in the bore.

In the use and operation of the present animal calling device, the mouthpiece portion of the device is placed in the user's mouth and air is blown through the device. The air causes the reed to vibrate which produces the desired call. The restriction on the airflow caused by the closure means in the bore lowers the tone produced by the device to a level which is optimum for deer calling. This allows the user to produce the desired low tone without having to cup the hands or fingers around the barrel or sound chamber, as in prior art devices, leaving one or both hands free to manipulate a weapon or camera. The device is also capable of producing the sounds made by other animals, the tone being somewhat dependent on the force used in blowing air through the device; however, it has been found particularly effective for deer calling. Various materials may be used to produce the body portion of the call, the reed, and the closure means, and the device is durable for withstanding severe service conditions often encountered on photography or hunting trips.

Figure 10:
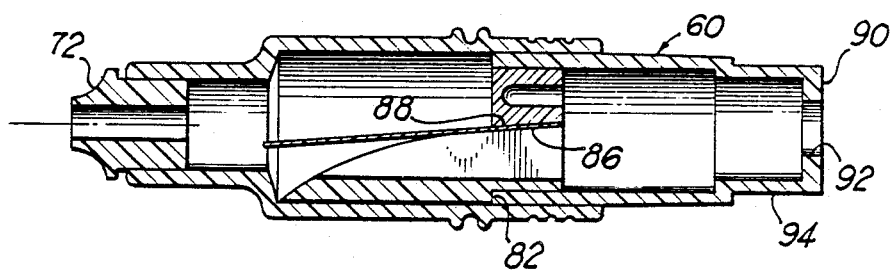
FIG. 10 is a cross-sectional view of the embodiment shown in preceding figure.

Another modification is shown in FIGS. 9 and 10, which modification uses essentially the same restricted bore opening and many of the same features as is shown in the prior embodiments, to lower the tone produced by the call. In this embodiment, the body is essentially composed of two parts, a barrel portion 60 and a cover portion 62. The mouthpiece 64 is inserted into the barrel portion, the mouthpiece being overlayed by a reed member 66 and a wedge block 68 which is inserted over the reed and into the barrel 60 to hold the reed in place. The cover portion 62 is then engaged with the barrel to cover the mouthpiece portion, thereby enclosing the mouthpiece and reed therein. As shown in FIG. 10 the end of the cover portion designated by numeral 70 has a circumference sufficient to closely surround the barrel 60 thereby providing essentially an air tight fit. An auxilary tube member 72 which forms an auxiliary mouthpiece for the cover portion 62 is inserted into the end of cover 62 opposite end 70 for comfort and to facilitate the placement of the call between the lips of the user.

Referring to FIGS. 9 and 10, it will be seen that mouthpiece 64 includes a central groove 74 which extends through the mouthpiece to communicate with barrel 60 Numeral 76 designates the end of mouthpiece 64 which is inserted into barrel 60. The upper portion of this end 64 of the mouthpiece is formed as a bridge portion 78, which serves as a base to seat the reed on the mouthpiece. The wedge block is then inserted over the reed and under the upper circumferential rim 80 of barrel 60.

Referring to FIG. 10, the end of the mouthpiece which is inserted into the barrel portion has a shoulder 82 which engages the rim 84 of barrel 60 as a stop to limit the degree of insertion of the mouthpiece into the barrel. As shown in FIG. 10, the upper surface 86 of the bridge portion 78 has a slight angle or slope which disposes the reed downwardly toward groove 74. The lower surface 88 of the wedge block 68 has a slope essentially matching that of the upper surface 86 of bridge 78, thereby securing the reed in a downwardly sloping position with respect to groove 74.

This configuration provides a particular advantage in that the call can be operated with very little effort, due in part to the increased surface area of the reed which is available to react with the air blown through the call body. In addition, as shown in FIG. 10, as air is blown through the call, the upper surface of the reed presents a greater reaction surface area than calls having reeds disposed essentially straight or in a single plane. The downward slope of the reed also helps to direct the air blown through the call through the central groove and out the barrel portion 60. There is a further advantage in that the sound desired is a low "grunt" sound such as that produced by the male deer during rut, thus, the call is designed to produce the desired low tone with a minimum of effort. The end of the barrel where the sound exits is essentially the same as that shown in FIG. 5, where wall extensions 90, having an aperture 92 therebetween, are formed essentially perpendicular to the longitudinal wall 94 of barrel 60, thus providing the restricted barrel which is a characteristic of the invention and designed for producing a low tone.

The provision of the bridge portion over the groove provides further advantages over prior art calls. In general, a thick reed produces a lower tone than a relatively thinner reed but more effort is required in blowing into the call to cause the thick reed to vibrate. Utilizing the bridge as a base, however, eliminates the need to span the groove with the reed in order to have the reed properly seated. Thus, a thick reed with a narrower seated end portion can be used to minimize the effort required to produce the desired sound by blowing into the call.

While an embodiment of an animal calling device having a restricted bore opening and modifications thereof have been shown and described in detail herein, various other changes and modifications may be made without departing from the scope of the present invention.

I claim:

1. An animal calling device comprising a main body portion having a generally cylindrical end with a bore therethrough, said bore having protrusions formed on the inner surface thereof, a mouthpiece portion having a groove formed therein, one end of said mouthpiece portion being disposed in said cylindrical end for establishing communication between said groove and said bore, said one end of said mouthpiece portion being laterally widened to define a bridge portion, a reed member having one end seated on said bridge portion and secured at the interface of said cylindrical end and said end of said mouthpiece portion, said reed member extending from said seated end to overlie said groove, and elastomeric closure means for said bore for restricting air flow through said device, said closure means engaging said protrusions to provide interfitting therebetween and allowing restricted air flow therearound for lowering the tone produced by the device.

2. An animal calling device as defined in claim 1 in which said closure means includes a resilient plug disposed in said bore, having a diameter substantially equal to the diameter of said bore.

3. An animal calling device as defined in claim 1 in which said closure means includes a resilient plug disposed in said bore, having an aperture formed therein for airflow through said plug.

4. An animal calling device as defined in claim 1 in which said cylindrical end is an elongated barrel and said bore is formed centrally in said barrel.

5. An animal calling device as defined in claim 4 in which said closure means includes a resilient cap of a size to closely fit the outer surface of said barrel, said cap having an aperture formed therein for restricting airflow therethrough.

6. An animal calling device as defined in claim 1 in which said closure means includes a resilient cap of a size to closely fit the outer surface of said cylindrical end, said cap having an aperture formed therein for restricting airflow therethrough.

7. An animal calling device comprising a main body portion having a generally cylindrical barrel portion with a centralized bore therethrough and a mouthpiece portion with a groove formed therein, said mouthpiece portion having one end disposed in said barrel portion, said one end being laterally widened to define a bridge portion, a vibratable reed having one end seated on said bridge portion and secured at the interface of said barrel portion and said mouthpiece portion, said reed extending from said seated end to overlie said groove, and a closure means for substantially covering said bore, said closure means including a cap of a size to closely fit the outer surface of said bore and having an aperture formed therethrough for restricting air flow through said bore thereby lowering the tone produced by said device.

8. An animal calling device comprising a generally cylindrical barrel portion having a fully open end and an opposite end with a restricted opening, a mouthpiece portion having a groove formed therein, one end of said mouthpiece portion being disposed in said fully open end of said barrel for establishing communication between said groove and said barrel, said one end of said mouthpiece portion being laterally widened to define a bridge portion, said bridge portion spanning said groove at the point of insertion of said mouthpiece portion into said barrel, a vibratable reed member having one end seated on said bridge portion and freely extending from said seated end to overlie said groove, and a wedge block disposed over said reed member and forcefully interfitted into said fully open end of said barrel for holding said reed member in place.

9. An animal calling device as defined in claim 8 and including an open-ended cover member disposed around said mouthpiece portion with one end engaging said barrel for enclosing said reed member therein, the opposite end being insertable between the lips of the user.

10. An animal calling device as defined in claim 8 in which said bridge portion has an upper surface sloping downwardly away from said restricted barrel opening for angling said reed member toward said groove.

* * * * *